(12) United States Patent
Dolev

(10) Patent No.: US 11,128,446 B2
(45) Date of Patent: Sep. 21, 2021

(54) SELF-STABILIZING SECURE AND HETEROGENEOUS SYSTEMS

(71) Applicant: B. G. NEGEV TECHNOLOGIES AND APPLICATIONS LTD., AT BEN-GURION UNIVERSITY, Beer Sheva (IL)

(72) Inventor: Shlomi Dolev, Omer (IL)

(73) Assignee: B.G. NEGEV TECHNOLOGIES AND APPLICATIONS LTD., AT BEN-GURION UNIVERSITY, Beer Sheva (IL)

( * ) Notice: Subject to any disclaimer, the term of this patent is extended or adjusted under 35 U.S.C. 154(b) by 209 days.

(21) Appl. No.: 16/093,371

(22) PCT Filed: Apr. 13, 2017

(86) PCT No.: PCT/IL2017/050448
§ 371 (c)(1),
(2) Date: Oct. 12, 2018

(87) PCT Pub. No.: WO2017/179059
PCT Pub. Date: Oct. 19, 2017

(65) Prior Publication Data
US 2019/0190705 A1 Jun. 20, 2019

Related U.S. Application Data

(60) Provisional application No. 62/429,881, filed on Dec. 5, 2016, provisional application No. 62/322,257, filed on Apr. 14, 2016.

(51) Int. Cl.
*H04L 29/06* (2006.01)
*H04L 9/08* (2006.01)
(Continued)

(52) U.S. Cl.
CPC ............ *H04L 9/0825* (2013.01); *G06F 21/52* (2013.01); *G06F 21/55* (2013.01); *G06F 21/577* (2013.01);
(Continued)

(58) Field of Classification Search
CPC .. G06F 2221/034; G06F 21/577; G06F 21/55; G06F 21/52; G06F 7/588;
(Continued)

(56) References Cited

U.S. PATENT DOCUMENTS 6,671,821 B1 * 12/2003 Castro .................. G06F 21/577
714/4.3
7,694,250 B2 4/2010 Boutin
(Continued)

OTHER PUBLICATIONS

NPL 2005—Implementing Trustworthy Services Using Replicated State Machines, obtained on Sep. 30, 2020 fr https://www.cs.cornell.edu/fbs/publications/TrustSurvey.pdf (Year: 2005).*
(Continued)

*Primary Examiner* — Tri M Tran
(74) *Attorney, Agent, or Firm* — Alston & Bird LLP

(57) ABSTRACT

A method for providing self-stabilization of functionality security and privacy to a distributed computer system with self-stabilizing machines, according to which the system periodically and constantly recovers from cyber-attacks performed by an adversary who gained access to the system during a vulnerability window. Then a True Random Number Generator (TRNG) generates a random number from which generating a pair of public and private keys are generated. The public key of the pair is distributed among neighboring machines, to generate a common symmetric secret key. Each machine to exchanges messages with any other machine using messages that are encrypted and decrypted by their established common symmetric secret
(Continued)

key, where all keys are generated using random numbers that were generated by the True Random Number Generator.

16 Claims, 1 Drawing Sheet

(51) Int. Cl.
| | |
|---|---|
| *G06F 21/52* | (2013.01) |
| *G06F 21/55* | (2013.01) |
| *G06N 20/00* | (2019.01) |
| *G06F 21/57* | (2013.01) |
| *G06F 7/58* | (2006.01) |

(52) U.S. Cl.
CPC .............. *G06N 20/00* (2019.01); *H04L 9/083* (2013.01); *H04L 9/0869* (2013.01); *H04L 63/0435* (2013.01); *G06F 7/588* (2013.01); *G06F 2221/034* (2013.01); *H04L 2209/46* (2013.01)

(58) Field of Classification Search
CPC ..... G06N 20/00; H04L 9/0825; H04L 9/0869; H04L 9/083; H04L 63/0435; H04L 2209/46
See application file for complete search history.

(56) References Cited

U.S. PATENT DOCUMENTS

| | | | |
|---|---|---|---|
| 2007/0206799 A1 | 9/2007 | Wingert et al. | |
| 2007/0299955 A1* | 12/2007 | Hoffman | ............... G06F 16/275 709/223 |
| 2010/0034377 A1* | 2/2010 | Kamel Ariffin | ....... H04L 9/0841 380/46 |
| 2013/0013931 A1* | 1/2013 | O'Hare | ................... H04L 9/085 713/189 |

OTHER PUBLICATIONS

Blanchard, P. et al., *Practically Self-Stabilizing Paxos Replicated State-Machine*, NETYS 2014, May 2014, Marrakech, Morocco; Networked Systems—Second International Conference, NETYS 2014, Marrakech, Morocco (May 15-17, 2014) 15 pages.

Chase, J., *Distributed Systems, Failures, and Consensus*, [online] slides from last week of classes of CPS 212; Distributed Information Systems course at Duke University, Dept. of Computer Science [online] [retrieved Oct. 10, 2018] Retrieved from the Internet: <https://www.cs.duke.edu/courses/fall07/cps212/consensus.pdf>. (Nov. 26, 2007) slides 1, 2, 4, 5, 6, 9, 11, 25, 62, 66 (79 pages).

Treaster, M., *A Survey of Fault-Tolerance and Fault-Recovery Techniques in Parallel Systems*, (Jan. 1, 2005) 11 pages; available at <https://pdfs.semanticscholar.org/3a91/0e34df852726243d968235ebf75854ee503a.pdf>.

International Search Report and Written Opinion for Application No. PCT/IL2017/050448 dated Jul. 3, 2017, 8 pages.

* cited by examiner

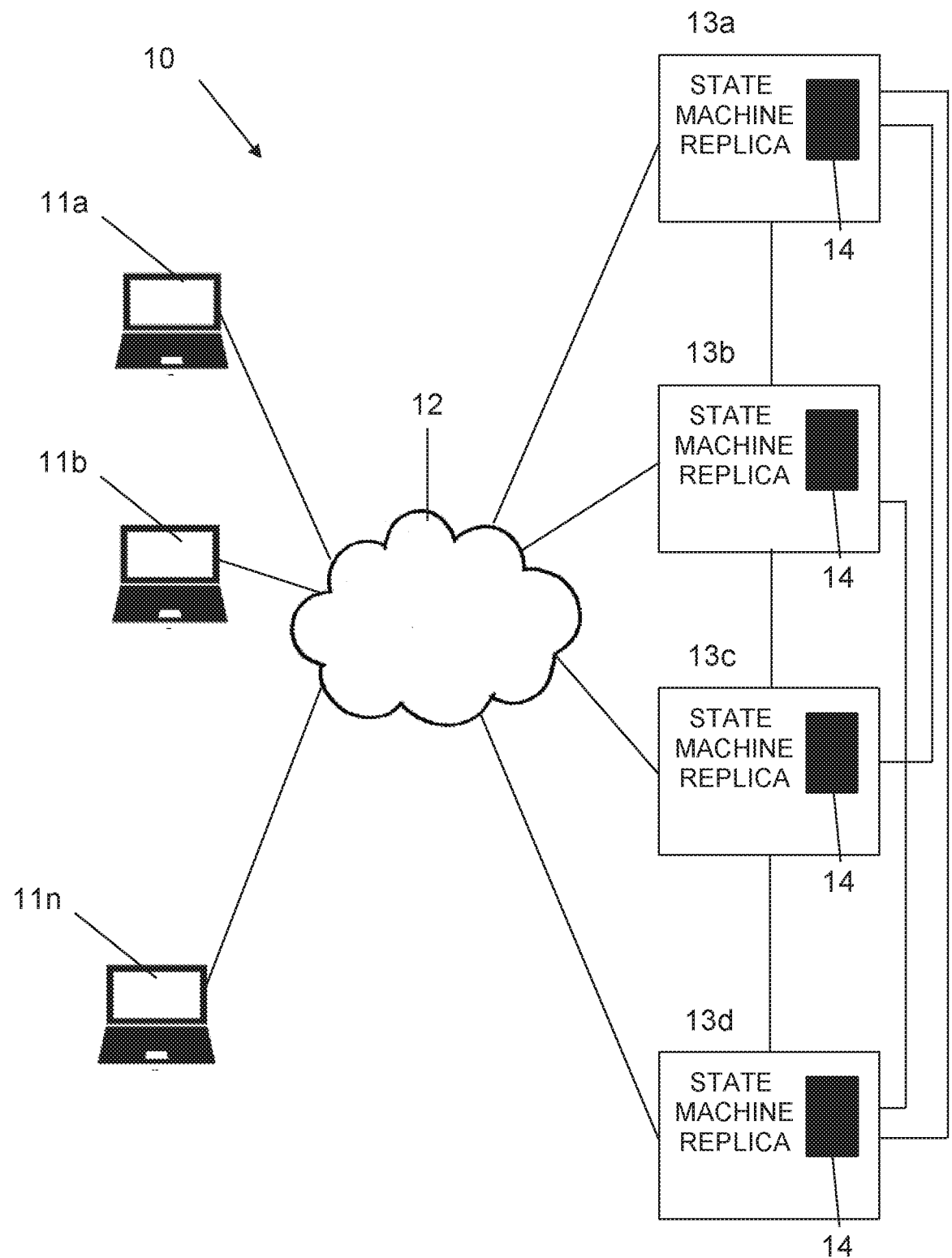

SELF-STABILIZING SECURE AND HETEROGENEOUS SYSTEMS

CROSS-REFERENCE TO RELATED APPLICATIONS

This application is a national phase entry of International Application No. PCT/IL2017/050448, filed Apr. 13, 2017, which claims priority to U.S. Patent Application Nos. 62/322,257, filed on Apr. 14, 2016 and 62/429,881, filed on Dec. 5, 2016, the entire contents of which are incorporated herein by reference.

FIELD OF THE INVENTION

The present invention relates to the field of distributed multi-party computation. More specifically, the present invention is related to a method for providing self-stabilization of functionality, security and privacy to distributed computer system consisting of multi-party computation of a replicated state machine which is subjected to cyber-attacks.

BACKGROUND OF THE INVENTION

A distributed computer system provides services to clients (such as processors running software applications) in response to request operations submitted by the clients. The computer system is implemented by several servers to create a fault-tolerant system. A distributed computer system consists of several machines (servers), each having its own processor and local memory. There might be some shared memory as well. These processes and their interconnection form a graph which is known as topology of the system. Each machine in the system has a local state. The global state of the system is the unification of the local states of its components. The behavior of the system consists of a set of states, a transition relation between them, and a fairness criterion on the transition relation. The concept of "self-stabilization" defines a system to be self-stabilizing if it is guaranteed to arrive at a legitimate state in a finite number of steps, regardless of the initial global state.

Self-stabilization in face of *Byzantine* faults (a situation in distributed computer systems when arbitrary faults occurred in the past and in face of active malicious faults) is characterized in terms of a "malicious adversary" whose objective is to disrupt the normal operation of the system. The adversary may destroy some portions of the system, or disrupt their operation. It might not be possible for a system to detect that it has been "attacked", as soon as the attack appears. To be called self-stabilizing *Byzantine* faults tolerant, a system must have the capability, to recover normal operation in the face of such attacks. If the system (or parts of it) is destroyed completely, so that it is no longer possible for the system to operate, then no self-stabilizing *Byzantine* faults tolerant system can work. However, if enough components of the system are (recovered to become) non. *Byzantine*, then a self-stabilizing system will (possibly and gradually) resume normal operation after the attack. It is up to the designer to decide under what conditions the system may be termed "completely destroyed" or "still capable of operating".

Self-stabilization has been traditionally used as an approach to handle faults in an holistic manner, where there is no specific mitigation for every fault scenario, as some fault scenarios maybe neglected or unexpected. From every global state, reached due to faults or unexpected conditions, once the (minimum) execution requirements hold the system is designed to regain its consistency automatically by itself with no outside intervention. In particular, the following problems and unexpected situations are addressed by self-stabilization:

Inconsistent Initialization: Different processes may be initialized in a fashion inconsistent with each other, or with garbage. Self-stabilizing systems are used to eliminate the overhead of initialization. No matter what the initial state, a self-stabilizing system reaches a legitimate state in a finite number of operations.

Mode Change: A system may be designed to operate in more than one mode. While switching modes (changing functionality), it will be impossible for all processes to simultaneously switch modes. A self-stabilizing system guarantees completion of change of mode in a finite number of operations.

Transmission Error: Errors in transmission leading to corruption of data may be handled by self-stabilizing systems, as well.

Process Failure and Recovery: Once a process recovers after failing, its state may be inconsistent with the rest of the system. Self-stabilization guarantees consistency of the process after a finite number of operations.

Memory Crash: If a local memory of a process crashes, its state may become inconsistent with the system self-stabilization can be used to recover from such inconsistent global scenarios.

Other unexpected situations may result from changes in bits in the memory, electric spikes, malicious intrusion for a relatively long time and other cyber activity that allows an adversary to take control of the system.

Self-stabilizing systems need not be initialized and can recover from transient failures. The failure history in these systems is less relevant—the system should recover and return to normal operation from any state or with any value in its memory.

However, such existing self-stabilizing systems provide a solution that is mainly directed to their functional recovery, and are incapable of recovering other properties which are related to cyber-attacks, such as maintaining the privacy of users or data secrecy.

It is well known that when an adversary (such as an intruder) gains access to the system's components following a cyber-attack, no privacy can be longer maintained. Recovery of a server from such attacks can be carried out by installing a software patch (software designed to fix or update a computer program or its supporting data, including fixing security vulnerabilities) that is sent to the sever in order to block the vulnerability, or by installing of an antivirus or another protection software, in order to remove the intruder from the system components by blocking access to them. However, privacy may still be compromised, since during the attack, the intruder has already gained all the information.

The same problem exists with respect to data security and secrecy. An adversary (such as an intruder) may gain access to encryption keys which are used to encrypt and decrypt messages and therefore, the adversary does not need to intrude into the system again—he can only listen to incoming/outgoing communication lines (which is much more difficult to detect) and decrypt all messages. It is possible to use other encryption keys. However, since the adversary had access to the memory or system's storage means, he may know the alternative keys, as well.

It is therefore an object of the present invention, to provide a method for providing self-stabilization of security and privacy of multi-party computation implementing a virtual replicated state machine, which were subjected to cyber-attacks.

It is another object of the present invention, to provide a method for providing self-stabilization of security and privacy of multi-party computation of a replicated state machine, even after full exposure of all system components to an adversary.

Other objects advantages of the present invention will become clear as the description proceeds.

SUMMARY OF THE INVENTION

A method for providing self-stabilization of functionality security and privacy to a distributed computer system consisting of one or more self-stabilizing machines, comprising the following steps:
 a) periodically and constantly recovering from cyber-attacks on the distributed computer system, performed by an adversary that gained access to the system during a vulnerability window of the system;
 b) activating a True Random Number Generator (TRNG) to generate a random number and using the random number for generating a pair of public and private keys;
 c) distributing the public key of the pair among neighboring machines, to generate a common symmetric secret key;
 d) allowing each machine to exchange messages with any other machine using messages that are encrypted and decrypted by their established common symmetric secret key,
 where all keys are generated using random numbers that were generated by the True Random Number Generator.

During the vulnerability window, the memory of the system and/or its components may be fully exposed to the adversary.

A threshold on the number of compromised components in the system may be not constant over-all-time-periods.

The generation and distribution of new public and private keys may be performed with the detection of being in vulnerability periods.

The distributed computer system may implement a replicated state machine or secure multi-party computation virtual state machines using secret-shares, for distributing the state and/or the input and/or the output of the machines. In one aspect, only a subset of the machines have self-stabilizing capability.

Preferably, each machine participating in the implementation of a replicated state machine is programmed differently, in order to get a heterogeneous implementation of participating machines. Also, each machine may run a different operating system.

A malfunctioning participant(s) implementing the replicated state machine, may be dynamically replaced by a currently more stable version participant, via agreement among the functioning participants of the replicated state machine, by choosing a version, based on trust established among the functioning participants. Trust among functioning participants may be established using different techniques including machine learning.

The present invention is also directed to a distributed computer system with self stabilization of functionality and security for providing a service to clients, which comprises:

a) a plurality of machine fully connected to each other, each of which is being executed on a separate processor and having a true random number generating apparatus (such as a TRNG), for:
  a.1) generating a pair of public and private keys for each machine using the machines' true random number generator;
  a.2) distributing the public key of the pair among neighboring machines, to generate a common symmetric secret key;
  a.3) allowing each machine to exchange messages with any other machine using messages that are encrypted and decrypted by their common symmetric secret key;
 b) a plurality of clients that interact with the service over a data network;
 c) a distributed consensus protocol for coordinating request interactions with a replicated state machine or a secure multi-party computation machine, participating in the implementation of a virtual replicated or secret shared state machine, that react to the inputs received from the clients,
wherein at least some of the machines is differently programmed or consists of different hardware with different parameters.

In one aspect, upon receiving a request from a client, each machine receives the request and uses the distributed consensus protocol to agree that the request is valid and order the execution of the request by a global agreed upon order, agreed by all non-Byzantine machines.

Each state machine replica may execute its corresponding task to fulfill the request and sends the execution result back to the client.

The hardware parameters may include:
memory type;
memory size;
CPU architecture;
clock frequency;
hardware securing.

In one aspect, all machines participating in the implementation of a replicated state machine or of a secure multi-party computation state machine provide the service to all clients.

BRIEF DESCRIPTION OF THE DRAWINGS

In the drawings:

FIG. 1 schematically illustrates the architecture of a distributed computer system consisting of multi-party computation of a replicated state machine with self-stabilization of functionality, security and privacy, according to an embodiment of the invention.

DETAILED DESCRIPTION OF THE INVENTION

The present invention proposes a method for automatic regaining of the functionality, security and privacy of a distributed computer system (consisting of one or more self-stabilizing machines (e.g., servers), connected over a data network), following full exposure (of the memory of the system and/or its components) to an adversary, where the (artificial) threshold on the number of compromised components in the system is not constant/respected over-all-time-periods. During exposure (resulting, from cyber-attacks on the distributed computer system during a vulnerability window), the adversary who initiated the cyber-attacks gained access to the distributed computer system. The distributed computer system may be designed to implement a replicated state machine or secure multi-party computation virtual state machines using secret-shares, for distributing the state and/or the input and/or the output of the machines. The method proposed by the present invention provides automatic regaining of the functionality, security and privacy when all, or only a subset of the machines have self-stabilizing capability.

Cryptology (coding and decoding information) requires tremendous amount of computational power. Nowadays, the security of most cryptographic systems is determined by the complexity of its corresponding attacks which are believed to be impracticable for actual cryptosystems and size of the encryption key. The message to be sent is called 'plain text' and the disguised message is called the cipher text. The process of converting plain text into cipher text is the encryption and the reverse process is the decryption. Computing devices or machines are represented by a behavior model composed of a finite number of states, transition between those states and actions in which one can inspect the way logic runs when certain conditions are met. The proposed method may be implemented using machines participating in secure multi-party computation, or replicated state machines. Employment of both types of state machines will be described below.

Secret Shared State Machines

Finite state machines are also used for implementing a secret sharing virtual global state machine scheme. Secret-sharing is a tool used in many cryptographic protocols. Secret-sharing schemes have numerous applications in cryptography and distributed computing including secure information storage, secure multiparty computations, access control and more. A secret-sharing scheme involves a dealer who has a secret, a set of n parties, and a collection of subsets of k parties. According to a secret-sharing scheme, the dealer distributes shares to the parties such that any subset of k parties can reconstruct the secret from its shares, and any subset with less than k parties cannot reveal any partial information on the secret. Such a scheme is described for example, in the article "How to Share a Secret", A. Shamir, Communications of the ACM, No. 11, Vol. 22, or by equivalent methods. Later on, secure multi-party computation based on secret sharing are used, such that the participants execute the program without knowing the secret shared state and/or the secret shared inputs.

In practice, there are vulnerability periods, in which part of, or even all the participants that implement the secret-shared state machine are compromised. The present invention proposes to automatically regain secrecy and privacy following such vulnerability periods, namely, following periods in which the adversary power is not limited, and in which it can essentially compromise a part of, or even all the component of the system.

Forward Secrecy

Forward secrecy is a property of secure communication protocols in which compromise of long-term keys does not compromise past session keys. Forward secrecy guarantees that a passive adversary who knows a key cannot discover previous keys.

Backward Secrecy

Backward secrecy (symmetric to the forward secrecy) guarantees that a passive adversary who is able to discover current key for a limited time period cannot predict future keys.

In the present invention, backward secrecy is of main interest, so as to assure that such a detected. (or undetected) compromise does not imply the loss of privacy and secrecy forever, that recovery is possible.

Using Self-Stabilizing (of Functionality, Secrecy and Privacy) Replicated State Machine or Secret Shared Virtual State Machines for Regaining Secrecy Following Full Exposure to an Adversary In one embodiment, the servers that implement a replicated state machine use true random sources to periodically renew keys, thereby nullifying the possible leakages during past attacks.

In addition, according to another embodiment, a secret shared virtual state machine is used instead of replicated state machine, to gain privacy among the computation participants. This way, information leakage of the state and the streaming inputs via bots (i.e., computers that a remote attacker has accessed and set up to forward transmissions including spam and viruses to other computers on the Internet) residing in a subset of the participating parties is prevented. Such a secret shared virtual state machine is implemented by (information theoretic or computational theoretic) secure-multi-party computation (methods for parties to jointly compute a function over their inputs while keeping those inputs private), receiving streaming inputs from the environment in the form of secret shares, and output back the computed output either in clear text or in the form of secret shares, as well.

The present invention proposes a new approach in cryptography, where the design of the system should withstand periods in which the system is fully vulnerable, with or without the detection of being in such vulnerability periods. The new approach provides automatic regaining of functionality, as well as regaining the security and privacy properties.

For example, a protocol that uses seeds for producing pseudo-random sequences may suffer a full exposure of the randomness used forever and therefore may be deemed to expose the entire current and future computation, thereby, losing the self-stabilizing cryptographic property.

An example of a task that can benefit from the self-stabilization of functionality and secrecy and privacy of replicated state machine or secret shared state virtual machine is an adaptive machine learning scheme, which is based only on a bounded number of the recent streaming inputs. A secure-multi-party system with (hardwired) machine learning program that maintains a bounded FIFO queue with only the relevant recent inputs and executed a function over these inputs and output (e.g., a machine learning prediction) value, is inherently refreshing the (FIFO queue) state during the execution. Thus, if an adversary manages to reveal the state or even corrupt the state, then within a following bounded number of inputs, the state is totally refreshed, and the output becomes correct.

The participants execute the program without knowing the secret shared state and/or the secret shared inputs. Furthermore, the stabilizing secure multi-party computation should introduce and use fresh randomization such as a True Random Number Generator (TRNG—a hardware device that generates random numbers from a physical process, rather than a computer program), rather than pseudo random sequence based on seeds that might be totally exposed during vulnerable periods. According to the present invention, the distributed computerized system uses its self-stabilization capability to periodically and constantly recover from the attack.

After the adversary loses access to the system (usually in response to defensive acts), it is possible to use the fresh randomization to build fresh (new) secret keys using a True Random. Number Generator (TRNG) that generates a random number, which is used to generate a fresh symmetric secret key, established between any two participants, possibly by means of each participant establishing a new pair of public and private keys from the TRNG. The public key of this pair is distributed among neighboring machines, to generate a common symmetric secret key with each neighboring machine, for decrypting messages exchanged between these neighboring machines, thereby distributing it between all participants. For example, it is possible to get a true random number by every participant and use it to locally create a pair of public and private keys for every participant, where the private key is solely known to that participant that produced it.

Then the public key is published to its neighboring machine, in order to get a common symmetric secret key, thereby establishing for each participant a common fresh and symmetric secret key with every other participant. Then, each machine can exchange messages with any other machine using messages that are encrypted and decrypted by their established common symmetric secret key, where all keys are generated using random numbers that are generated by the TRNG.

As this process advances, the adversary loses more and more information, until his previous knowledge cannot be used to decrypt messages.

A possible Self-Stabilizing Secure Multi-Party Computation Secret Share State Machine may operate as follows:

Step 1: upon an arrival of secret share of an input;

Step 2: initialize and execute secure Multi-Party Computation (SecretSharedState, SecretSharedInput, TransitionFunction).

Replicated State Machines

State machine replication is a general method for implementing a fault-tolerant distributed service by replicating servers and coordinating client interactions with server replicas. Distributed software is often structured in terms of clients and services. Each service comprises one or more servers and exports operations that clients invoke by making requests. Although using a single, centralized, server is the simplest way to implement a service, the resulting service can only be as fault tolerant as the processor executing that server. If this level of fault tolerance is unacceptable, then multiple servers that fail independently must be used. Usually, replicas of a single server are executed on separate processors of a distributed system, and protocols are used to coordinate client interactions with these replicas. The physical and electrical isolation of processors in a distributed system ensures that server failures are independent, as required.

A State Machine has a set of States, a set of Inputs, a set of Outputs, a transition function (Input×State→State) and an output function (Input×State→Output)

A State Machine begins at the State labeled. Start. Each. Input received is passed through the transition and output function to produce a new State and an Output. The State is held stable until a new Input is received, while the Output is communicated to the appropriate receiver. A State Machine is usually deterministic: multiple copies of the same State Machine begin in the Start state, and receiving the same Inputs in the same order will arrive at the same State having generated the same outputs.

State Machines can implement any algorithm when driven by an appropriate input stream, typically, systems based on State Machine Replication voluntarily restrict their implementations to use finite-state machines to simplify error recovery.

A simple technique for implementing a fault-tolerant service in terms of a State Machine is as follows:
1. Place copies of the State Machine on multiple, independent servers.
2. Receive client requests, interpreted as Inputs to the State Machine.
3. Choose a common ordering for the Inputs.
4. Execute inputs in the chosen order on each server.
5. Respond to clients with the Output from the State Machine.
6. Monitor replicas for differences in State or Output.

Using Self-Stabilizing Secure Replicated State Machines for Regaining Security Following a Full Exposure to an Adversary Replicated state machines are used daily in the industry to form a robust entity for critical component of a system. For example, each cloud computing service (such as services provided by Amazon or Google) consists of a large number of servers which are managed by a central point (a command and control manager) that also functions as an interface to the cloud resources (otherwise, that cloud cannot be accessed). Upon receiving a request for a service, the central point receives it and decides which server in the cloud will execute which task, in order to fulfill the request. In this case, the central point may be implemented as Replicated State Machines (clustered servers), such that when one of them fails (e.g., as a result of a cyber-attack), the remaining servers continue to function, until its recovery). There are several algorithms for automatically implementing such a recovery. Examples of such existing algorithms are:

1. Chubby lock service—a lock service developed by Google which is intended for use within a loosely-coupled distributed system consisting of moderately large numbers of small machines connected by a high-speed network. The purpose of the lock service is to allow its clients to synchronize their activities and to agree on basic information about their environment. The primary goals included reliability, availability to a moderately large set of clients, and easy-to-understand semantics; throughput and storage capacity were considered secondary.

2. Apache ZooKeeper—is an open source project that provides a centralized infrastructure and services that enable synchronization across a cluster. ZooKeeper maintains common objects needed in large cluster environments. Examples of these objects include configuration information, hierarchical naming space, and so on. Applications can leverage these services to coordinate distributed processing across large clusters. ZooKeeper provides an infrastructure for cross-node synchronization and can be used by applications to ensure that tasks across the cluster are serialized or synchronized. This is done by maintaining status type information in memory, on ZooKeeper servers (a ZooKeeper server is a machine that keeps a copy of the state of the entire system and persists this information in local log files).

3. Paxos—a family of protocols for solving consensus (the process of agreeing on one result among a group of participants) in a network of unreliable processors. This problem becomes difficult when the participants or their communication medium may experience failures. Consensus protocols are the basis for the state machine replication approach to distributed computing. The Paxos family of protocols includes a spectrum of trade-offs between the number of processors, number of message delays before learning the agreed value, the activity level of individual participants, number of messages sent, and types of failures. Although no deterministic fault-tolerant consensus protocol can guarantee progress in an asynchronous network, Paxos guarantees safety (consistency), and the conditions that could prevent it from making progress are difficult to provoke. Paxos is usually used where durability is required (for example, to replicate a file or a database), in which the amount of durable state could be large. The protocol attempts to make progress even during periods, when some bounded number of replicas is unresponsive. There is also a mechanism to drop a permanently failed replica or to add a new replica.

The traditional design is only robust to fail stops. In the face of cyber-attacks there is a need to tolerate more sophisticated faults such as malicious faults, or better off combinations of transient and permanent benign/malicious faults. For example, a cyber-attack may be directed to the cloud interface (the command-and-control manager) and if the cloud interface fails, all the servers in that cloud become inaccessible. An adversary that previously gained access to the cloud interface may identify weakness points in the managing software of the interface and may perform a cyber-attack (even after leaving the cluster as a result of (periodic) defensive operation, such as running an antivirus program), while using the previous knowledge to cause failures. For example, the adversary may submit a legitimate request for a service, which will cause (due to a known weakness point) the interface to perform a loop of iterations that may lead to failure/inaccessibility of the entire cloud.

A command-and-control manager, being part of implementation of a (distributed) Replicated state machine, receives requests and sends them to a server in the cloud, based on agreements (which is acceptable by all, or enough members of, the participants that implement the replicated state machine), which tasks should be performed, by which cloud server and the record of the assigned tasks for each server (thereby forming a "map" of agreements on tasks assigned to each cloud server, as a base for educate future task assignments).

The present invention suggests to employ an independency approach in the design and operation of replicated state machine, where each of the participants that implements the replicated state machine has the same definition for operation, typically, performing consensus on the state of the replicated state machine, the inputs and the transition.

The distributed algorithm that is based on message exchanges between the participants that implement the replicated state machine. The proposed method is to design and implement the program of each participates in implementing the replicated state machine, by a different (or subsets of the) team, over a variety of hardware components, operating-systems, programming-languages and compilers, in order to build an "immune" system that can survive malware attacks designed to use a current weakness of a particular system (before a patch is distributed and used). According to the proposed independency approach, each replicated state machine is programmed differently, in order to get a heterogeneous implementation of replicated state machines.

For example, the agreement algorithm (implemented w a replicated state machine) may be programmed using C++ or Java language that is run by Unix operating system (implemented by another replicated state machine). It should be noted that since the cluster is implemented by replicated state machines, each state machine has identical execution properties, even though it is written in different programmed and run by a different operating system. This is essential for a distributed implantation of the replication property.

The heterogeneous implementation of replicated state machines proposed by the present invention may be based on combination of system components by using different hypervisors (a hypervisor is a function which isolates operating systems and applications from the underlying computer hardware), or virtualization software (e.g., VMware) for running different virtual machines or different containers (a container is an executable package of a software that includes everything needed to run it, e.g., Docker: an open-source program that enables a Linux application and its dependencies to be packaged as a container), with different operating systems (such as Microsoft Windows, Linux), different programming languages (such as Java, C++, Python) that may be changed dynamically during operation whenever the un-attacked components detect a malfunctioning behavior of the participants (typically the minority of them). For example, if there is a cyber-attack on a replicated state machine which is programmed using the Python programming language in MS-Windows environment, at most, it will cause failure of that particular replicated state machine but not of another replicated state machine which is programmed using the C++ programming language in Unix environment. This way, survivability of a distributed system implemented by replicated state machines is dramatically increased, since in order to cause a cyber-attack to succeed, all replicated state machines should suffer from weakness at the same time (which is very unlikely).

Dynamic replacement of a malfunctioning participant(s) in implementing the state machine by a currently more stable version participant (e.g., a participant running in Unix, rather than on Windows, in times during which a vulnerability of windows is exploited prior to a correcting patch arrival) can be enforced via agreement among the functioning participants of the replicated state machine, by choosing a version based on trust established via say machine learning techniques.

The multi-party computational state machines may be privacy preserving version of replicated state machines.

FIG. 1 schematically illustrates a possible architecture of a distributed computer system consisting of multi-party computation of a replicated state machine with self-stabilization of functionality, security and privacy, according to an embodiment of the invention. The proposed distributed computer system consists of servers connected in a fashion that allows the realization of (1) a replicated state machine or (2) secure multi-party computation state machine that is self-stabilizing, to reach legitimate functionality security and privacy in the presence of transients and Byzantine faults.

The distributed computer system 10 includes n clients, 11a-11n that interact with a service via a data network 12 and implemented by state machine replicas 13a-13d, each of which is executed on a separate processor. All state machine replicas 13a-13d are fully connected to each other (i.e., each state machine replica is connected to all other state machine replicas). This arrangement can replicate for example, a server that provides the service to all n clients. Clients 10a-10n send request to state machine replicas 13a-13d, respectively. For example, request interactions with state machine replicas 13a-13d are coordinated using a distributed consensus protocol (a communication rule to exchange state information between users and their neighbors in order to reach group agreement by means of distributed decision making).

Each state machine replica 13*a*, . . . , 13*d* has a fresh randomization apparatus, such as a True Random Number Generator 14 (which may be a part of its hardware or an external USB device) to build new symmetric secret keys, which are distributed between all participants, such that the adversary loses more and more information, until his previous knowledge cannot be used to decrypt messages.

As explained above, heterogeneous implementation of replicated state machines may be obtained by differently programming each replicated state machine. This way distributed computer system 10 becomes more immune and can survive malware attacks designed to use a current weakness of a particular system.

Alternatively, immunity may be increased if the machines participating in the implementation of the replicated state machine 13*a*-13*d* consist of different hardware with different parameters, such as memory type (RAM, Flash memory), memory size, CPU architecture, clock frequency, types of secure hardware, such as secure flash memory using encryption of information stored.

Upon receiving a request from a client 11, each state machine replica 13*a*, . . . , 13*d* receives the request and uses the distributed consensus protocol to agree that the request actually was sent from a client 11, in order to prevent a situation where one of them is untrusted. Each state machine replica 13*a*, . . . , 13*d* executes its corresponding task to fulfill the request and sends the execution result back to the client 11. Client 11 uses this execution result only if the same execution result has been provided by at least t+1 of the state machine replicas where t is the number of Byzantine participants that should be tolerated during/after convergence to legal functionality, security and privacy (usually t is strictly less than one third of the number of participants n, where in the example for which n=4, t+1=2).

The above examples and description have of course been provided only for the purpose of illustration, and are not intended to limit the invention in any way. As will be appreciated by the skilled person, the invention can be carried out in a great variety of ways, employing more than one technique from those described above, all without exceeding the scope of the invention.

The invention claimed is:

1. A method for providing self-stabilization of functionality security and privacy to a distributed computer system consisting of one or more self-stabilizing machines, connected over a data network, comprising:
   a) periodically and constantly recovering from cyber-attacks on said distributed computer system, performed by an adversary that gained access to said distributed computer system during a vulnerability window of said distributed computer system;
   b) activating a True Random Number Generator (TRNG) to generate a random number and using said random number for generating a fresh symmetric secret key established between any two participants, implementing a replicated state machine by means of each participant establishing a new pair of public and private keys from the TRNG;
   c) distributing the public key of said pair among neighboring machines, to generate a common symmetric secret key with each neighboring machine, for decrypting messages exchanged between said neighboring machines;
   d) allowing each machine to exchange messages with any other machine using messages that are encrypted and decrypted by their established common symmetric secret key; and
   e) dynamically replacing a participant of the replicated state machine that is a malfunctioning participant by another participant that is currently stable via agreement among the participants of the replicated state machine that are functioning,
   wherein all keys are generated using random numbers generated by said True Random Number Generator, and
   wherein the replicated state machine is one of a plurality of replicated state machines with each replicated state machine being programmed differently, to get a heterogeneous implementation of replicated state machines, wherein and each of the participants that implements said replicated state machine has the same definition for operation, to thereby achieve consensus among said participants regarding, the inputs, the states and the transition between states, of said replicated state machine.

2. The method according to claim 1, wherein during the vulnerability window, the memory of the system and/or its components has been fully exposed to the adversary.

3. The method according to claim 2, wherein a threshold on the number of compromised components in the system is not constant over-all-time periods.

4. The method according to claim 1, wherein the generation of new public and private keys and distribution of the public keys for establishing new symmetric keys is performed with the detection of being in vulnerability periods.

5. The method according to claim 1, wherein the distributed computer system implements the replicated state machine using secret-shares, for distributing the state and/or the input and/or the output of said replicated state machine.

6. The method according to claim 1, wherein only a subset of the machines have self-stabilizing capability.

7. The method according to claim 6, wherein several machines participating in the implementation of a replicated state machine are programmed differently from the machines participating in the implementation of another replicated state machine, in order to get a heterogeneous implementation of participating machines.

8. The method according to claim 6, wherein several machines run different operating systems.

9. The method according to claim 6, wherein dynamically replacing the malfunctioning participant implementing the replicated state machine, by the currently stable participant, via agreement among the functioning participants of said replicated state machine, comprises choosing a currently stable participant, based on trust established among said functioning participants.

10. The method according to claim 9, wherein trust among functioning participants is established using machine learning.

11. A distributed computer system with self-stabilization of functionality and security for providing a service to clients, comprising:
   a) a plurality of machines fully connected to each other, each of which is being executed on a separate processor and having a true random number generating apparatus, for:
   a.1) generating a pair of public and private keys for each machine using said true random number generating apparatus;
   a.2) distributing the public key of said each pair among neighboring machines of said each machine, to generate a common symmetric secret key for every two neighboring machines; and a.3) allowing each machine to exchange messages with any other machine using messages that are encrypted and decrypted by their common symmetric secret key;
    b) a plurality of clients that interact with said service over a data network; and
    c) a distributed consensus protocol for coordinating request interactions with a replicated state machine or a secure multi-party computation state machine, participating in the implementation of a virtual replicated or secret shared state machine, that react to the inputs received from said clients,
    wherein one or more of said machines are differently programmed or consists of different hardware with different parameters, and
    wherein a participant that is implementing said state machine and that is malfunctioning is dynamically replaced by another participant that is currently stable via agreement among other participants of the replicated state machine that are functioning.

12. The distributed computer system according to claim 11, in which upon receiving a request from a client, each machine receives said request and uses said distributed consensus protocol to agree that the request that is agreed to actually be received by all non-*Byzantine* machines, from said client.

13. The distributed computer system according to claim 11, in which each state machine replica executes its corresponding task to fulfill the request and sends the execution result back to the client.

14. The distributed computer system according to claim 11, in which hardware parameters are:
    memory type;
    memory size;
    CPU architecture;
    clock frequency; or
    hardware securing.

15. The distributed computer system according to claim 11, in which all machines participating in the implementation of a replicated state machine or of a secure multi-party computation state machine provide the service to all clients.

16. The distributed computer system according to claim 11, in which the randomization apparatus is a True Random Number Generator (TRNG).

\* \* \* \* \*

UNITED STATES PATENT AND TRADEMARK OFFICE
CERTIFICATE OF CORRECTION

PATENT NO. : 11,128,446 B2
APPLICATION NO. : 16/093371
DATED : September 21, 2021
INVENTOR(S) : Dolev It is certified that error appears in the above-identified patent and that said Letters Patent is hereby corrected as shown below:

In the Claims

Column 12,
Line 13, "wherein and each" should read --wherein each--.

Signed and Sealed this
Twenty-seventh Day of September, 2022

Katherine Kelly Vidal
*Director of the United States Patent and Trademark Office*